United States Patent
Gaska et al.

(10) Patent No.: US 9,581,219 B2
(45) Date of Patent: Feb. 28, 2017

(54) POWER TRANSMISSION BELT, IN PARTICULAR TOOTHED BELT, AND METHOD FOR THE PRODUCTION THEREOF

(75) Inventors: Roman Gaska, Sehnde (DE); Axel Unruh, Hannover (DE); Claus-Lueder Mahnken, Ahausen (DE); Thomas Baltes, Hannover (DE); Reinhard Teves, Seelze (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 854 days.

(21) Appl. No.: 13/398,311

(22) Filed: Feb. 16, 2012

(65) Prior Publication Data
US 2012/0142471 A1    Jun. 7, 2012

Related U.S. Application Data

(63) Continuation of application No. PCT/EP2010/062145, filed on Aug. 20, 2010.

(30) Foreign Application Priority Data

Sep. 11, 2009   (DE) .................. 10 2009 040 903
Jul. 7, 2010    (DE) .................. 10 2010 017 781

(51) Int. Cl.
*F16G 1/10*    (2006.01)
*F16G 1/28*    (2006.01)

(52) U.S. Cl.
CPC   *F16G 1/28* (2013.01); *F16G 1/10* (2013.01)

(58) Field of Classification Search
CPC .................. F16G 1/28; F16G 1/10
(Continued)

(56) References Cited

U.S. PATENT DOCUMENTS 4,486,375 A * 12/1984 Hirai ............................ 264/254
4,737,138 A *  4/1988 Komai et al. ................. 474/266
(Continued)

FOREIGN PATENT DOCUMENTS

DE           44 00 434 A1    7/1995
DE   10 2007 061 735 A1    7/2009
(Continued)

OTHER PUBLICATIONS

International Search Report dated Nov. 11, 2010 of international application PCT/EP 2010/062145.

*Primary Examiner* — Michael Riegelman
(74) *Attorney, Agent, or Firm* — Walter Ottesen, P.A.

(57) ABSTRACT

A power transmission belt (20) having an elastic main body (17) includes a top layer as the belt backing and a bottom section having a power transmission zone. The power transmission zone and/or the top layer has/have a coating (15, 16), characterized in that the coating (15, 16) of the power transmission zone and/or the top layer includes at least the following layer construction: a base coating (18) made of a textile material, wherein the base coating (18) forms a bond with the elastic main body (17) and has a surface coating (19) including at least a mixture A, which contains at least one reactive diluent as per DIN 55945:2007-03. The invention further relates to a method for producing such a power transmission belt. The novel coating concept is applicable in particular in a toothed belt.

13 Claims, 1 Drawing Sheet

(58) Field of Classification Search
USPC .................................... 427/389.9; 474/205
See application file for complete search history.

(56) References Cited

U.S. PATENT DOCUMENTS

| | | | |
|---|---|---|---|
| 5,112,282 A * | 5/1992 | Patterson | 474/260 |
| 5,234,387 A * | 8/1993 | Fujiwara et al. | 474/205 |
| 5,322,479 A * | 6/1994 | Le Devehat | 474/101 |
| 6,419,775 B1 * | 7/2002 | Gibson et al. | 156/137 |
| 6,739,997 B2 * | 5/2004 | Di Meco et al. | 474/260 |
| 6,964,626 B1 * | 11/2005 | Wu et al. | 474/260 |
| 7,137,918 B2 * | 11/2006 | Nonnast et al. | 474/260 |
| 7,749,118 B2 | 7/2010 | Baldovino et al. | |
| 7,824,288 B2 * | 11/2010 | Wu et al. | 474/268 |
| 7,946,940 B2 | 5/2011 | Kanzow et al. | |
| 7,985,152 B2 * | 7/2011 | Di Meco et al. | 474/205 |
| 2004/0048708 A1 * | 3/2004 | Nonnast et al. | 474/260 |
| 2006/0264289 A1 * | 11/2006 | Ballhausen et al. | 474/263 |
| 2008/0032837 A1 * | 2/2008 | Unruh et al. | 474/143 |
| 2010/0240481 A1 | 9/2010 | Baldovino et al. | |

FOREIGN PATENT DOCUMENTS

| | | |
|---|---|---|
| DE | 10 2008 013 570 A1 | 9/2009 |
| EP | 1 881 229 A2 | 1/2008 |
| WO | WO 2007/036960 A1 | 4/2007 |

* cited by examiner

POWER TRANSMISSION BELT, IN PARTICULAR TOOTHED BELT, AND METHOD FOR THE PRODUCTION THEREOF

CROSS REFERENCE TO RELATED APPLICATIONS

This application is a continuation application of international patent application PCT/EP 2010/062145, filed Aug. 20, 2010, designating the United States and claiming priority from German applications 10 2009 040 903.3 and 10 2010 017 781.4, filed Sep. 11, 2009 and Jul. 7, 2010, respectively, and the entire content of the above applications is incorporated herein by reference.

FIELD OF THE INVENTION

The disclosure relates to a force transmission belt having an elastic foundational body, comprising a top ply as belt backing and a substructure having a force transmission zone, wherein the force transmission zone and/or the top ply is/are provided with a coating. The disclosure further relates to a process for producing such a drive belt.

BACKGROUND OF THE INVENTION

Force transmission belts, which are also referred to as drive belts and which form endless loops in the operational state, can be configured as flat belts, V-belts, V-ribbed belts and toothed belts.

The surface of these force transmission belts and of a toothed belt in particular has to have good gliding properties and be wear resistant. Such a surface is achieved through a coating with or without textile cover ply. When the force transmission belt is operated under an oil atmosphere, an additional requirement is good oil resistance to protect the coating and the rubber mixture(s) underneath from the penetration of oil.

Mixtures of a flexible polymeric layer with fillers are typically used for this because they are both readily glidable and oil resistant.

DE4400434A1, EP0662571A1 and U.S. Pat. No. 6,419,775 describe woven fabric coatings that consist of a polyurethane coating with particulate fluoropolymers and provide good abrasion resistance. The two-component coating mass has a low viscosity, penetrates into the woven fabric relatively deeply and undergoes crosslinking to form an abrasion-resistant layer. However, these layers have an open structure and so are insufficiently abrasion-resistant for many applications. Furthermore, owing to this open structure they are not oil-resistant and owing to the polyurethanes used their thermal stability is insufficient for many applications.

The lack of heat resistance is taken up in U.S. Pat. No. 7,946,940 where 1,2-diols are disclosed as not being as heat-resistant as the longer-chain 1-omega diols. There are again issues with abrasion and oil resistance.

DE102008013570A1 describes coating systems for woven fabric surfaces of force transmission belts, wherein the coating contains a polyisocyanurate-polyurea formed from an isocyanate having at least two NCO groups as base component. This coating exhibits outstanding glidability coupled with good heat resistance, but possesses unfavorable processability owing to the sensitivity of the coating masses. Moreover, because of the solvents needed, coating to deeply penetrate the woven fabric is not possible.

Gliding systems for belts having uninterrupted surfaces are described in U.S. Pat. No. 6,739,997, U.S. Pat. No. 7,985,152, U.S. Pat. No. 7,749,118 and EP1881229A1 for dry applications and in U.S. Pat. No. 7,749,118 and WO2007036960A1 for applications in oil. What is common to the systems described in the references cited is that they consist of a coating composed of an elastomeric matrix and a glidant which is present in less than 50% quantity and preferably is fluoropolymer containing. The elastomeric matrix is always based on commercially available polymers which, owing to their high molecular weight of >5000 g/mol, are incapable of penetrating into the woven fabric if applied with no or almost no solvent. The layer thus covers the woven fabric, but does not penetrate thereinto, leading to a slight breakdown of the woven fabric and, on the other hand, in use, to cracks through which oil, for example, is easily able to penetrate.

An improved heat resistance and an improved resistance to the skipping of teeth are said to be ensured by the toothed belt disclosed in U.S. Pat. No. 5,234,387. In this toothed belt, the tooth rubber and the backing rubber comprise a hydrogenated nitrile rubber polymer crosslinked with organic peroxide, and a co-crosslinker comprising N,N'-m-phenylenedimaleimide in combination with a compound from various acrylates, isocyanurates, mellitates, phthalates, carboxylates or metal salts. Advantages in respect of abrasion and/or oil resistance are not known for this.

SUMMARY OF THE INVENTION

The problem addressed by the present disclosure is therefore that of providing a force transmission belt whose force transmission zone and/or top ply possesses a coating which is media resistant, more particularly oil resistant, and abrasion resistant without having to make sacrifices in respect of dynamic loadability and durability. Media resistant is to be understood as meaning that the force transmission belt shall be more particularly resistant to gases, acids, bases, solvents, hydrocarbons and hydrocarbonaceous compounds, motor fuels, oils and oil fumes. Preference among these is given to resistance to oil and oil fumes, although the belt shall also be perfectly suitable for dry application.

This problem is solved when the coating on the force transmission zone and/or the top ply has at least the following layered construction:
- a base coating of a textile material, wherein the base coating combines with the elastic foundational body to form a bonded assembly, and
- a surface coating comprising at least a mixture A containing at least a reactive diluent as per DIN 55945: 2007-03.

The top ply and the substructure here combine to form as an overall unit the elastic foundational body of the force transmission belt, the foundational body consisting of an elastomeric material, especially in the form of a vulcanized mixture of rubber. The rubber component used is usually an ethylene-propylene copolymer (EPM), and ethylene-propylene-diene monomer polymer (EPDM), a (partially) hydrogenated nitrile rubber (HNBR), chloroprene rubber (CR) or fluororubber (FPM). Any tensile strands consist of steel, polyamide, aramid, polyester, glass fibers, carbon fibers, polyether ketone (PEEK) or polyethylene 2,6-naphthalate (PEN).

The base coating advantageously comprises a woven or knitted fabric. The material used for the woven or knitted fabric is preferably cotton or further natural fiber, for example flax, linen or hemp. However, it is similarly also possible to use aramid, nylon and/or polyester.

It was found that, surprisingly, a belt thus coated has particularly good resistance to media, especially to oil. At the same time, there are improvements in respect of abrasion resistance and glidability and the resulting durability. Noise generation, which is relevant in the automotive sector in particular for more and more manufacturers and/or their customers, surprisingly remains at virtually the same level.

The reactive diluent as per DIN 55945:2007-03 is selected from the group of methacrylates and/or acrylates and/or vinyl ethers and/or glycidyl ethers, of which methacrylates and/or acrylates are particularly preferable.

When acrylates are used, these preferably have isocyanate groups. There is a similar preference for difunctional groups at the chain end of the reactive diluent.

In one particularly preferable embodiment, the reactive diluent is dipropylene glycol diacrylate (DPGDA) and/or tripropylene glycol diacrylate (TPGDA) and/or hexanediol diacrylate (HDDA), preferably hexane 1,6-diol diacrylate (1,6-HDDA) and/or trimethylpropane triacrylate (TMPTA) and/or diurathene dimethacrylate (HEMA MDI).

In each case, a reactive diluent can be used alone or in combination with at least one further reactive diluent.

It is advantageous to use the reactive diluent in the A mixture in amounts of 2% to 90% by weight, preferably in amounts of 5% to 90% by weight, more preferably in amounts of 6% to 90% by weight and even more preferably in amounts of 10% to 80% by weight.

The reactive diluent here may also contain solvents. The weight percentages in this case are based on reactive diluent inclusive of solvent.

The percentages recited herein are always by weight, unless stated otherwise.

It is further advantageous for the mixture A to additionally contain at least a crosslinking agent and/or at least a pulverulent gliding body. The crosslinking agent used can be any crosslinking agent and crosslinking auxiliary known to a person skilled in the art. It is further preferable for the crosslinking reaction of the surface coating to be a free-radical crosslinking reaction.

When the mixture A contains a pulverulent gliding body, the latter is used in amounts of 0.1% to 50% by weight, preferably in amounts of 5% to 49% by weight and more preferably in amounts of 10% to 40% by weight. The pulverulent gliding body of mixture A is selected from the group consisting of polytetrafluoroethylene (PTFE) and/or modified polytetrafluoroethylene (TFM) and/or fluoroethylene polymer (FEP) and/or perfluoroalkyl vinyl ether-tetraethylene copolymer (PFA) and/or ethylene-tetrafluoroethylene copolymer (ETFE) and/or polyvinyl fluoride (PVF) and/or polyvinylidene fluoride (PVDF) and/or ultrahigh molecular weight polyethylene (UHMWPE), of which polytetrafluoroethylene (PTFE) and/or modified polytetrafluoroethylene (TFM) are particularly preferable.

It is also conceivable to use other pulverulent gliding bodies known to a person skilled in the art, for example silicates, sulfides, graphite, etc.

The pulverulent gliding bodies mentioned can be used alone or in combination.

The pulverulent gliding body advantageously has a coefficient of friction on steel of not more than 3.

It is a distinct advantage of the present disclosure that, when a pulverulent gliding body is used, it can be used in amounts of 50% by weight or less. Distinctly higher amounts are known from the prior art, and this is a significant cost factor in relation to the use of PTFE in particular.

In the present disclosure, more than 50% by weight of a pulverulent gliding body leads to deficient dynamic stability.

The surface coating may additionally contain a further, second mixture B composed of at least an isocyanate and/or at least a polyol.

The isocyanate may be a polyisocyanate selected from the group consisting of hexamethylene diisocyanate (HDI) and/or isophorone diisocyanate (IPDI) and/or 4,4'-dicyclohexyl-methane diisocyanate ($H_{12}$MDI) and/or hexahydrotolylene diisocyanate ($H_6$TDI), in which case any of these polyisocyanates can be present as biuret or uretdione or allophanate or isocyanurate or iminooxadiazinedione and used alone or mixed. The use of HDI is preferable.

Polyols may be triols as well as diols.

Preferably, the further, second mixture B additionally contains at least a particulate filler. This may comprise fluorine compounds, such as polytetrafluoroethylene (PTFE) and/or modified polytetrafluoroethylene (TFM) and/or fluoroethylene polymer (FEP) and/or perfluoroalkyl vinyl ether-tetraethylene copolymer (PFA) and/or ethylene-tetrafluoroethylene copolymer (ETFE) and/or polyvinyl fluoride (PVF) and/or polyvinylidene fluoride (PVDF) and/or ultrahigh molecular weight polyethylene (UHMWPE), but also silicates, for example mica, sulfides, for example molybdenum sulfide, graphite and further ones known to a person skilled in the art. Preference is in turn given to polytetrafluoroethylene (PTFE) and modified polytetrafluoroethylene (TFM).

The particulate fillers mentioned can be used alone or in combination. They serve as gliding/lubricating agents and contribute to reducing the coefficient of friction.

Mixture B may additionally contain at least a solvent.

When the surface coating contains a mixture A as first mixture and a second mixture B, it is advantageous for the ratio of mixture A to mixture B to be in the range from 7:3 to 1:1.

Particularly good resistance to media is obtained when the depth of penetration of the surface coating into the base coating is equal to at least half the thickness of the base coating. Advantageously, the surface coating is an uninterrupted structure without open pores through which various media, such as oil for example, can typically pass into the interior of the belt.

The force transmission belt is used as flat belt, V-belt, V-ribbed belt and toothed belt, the latter being particularly preferable. The toothed belt may be fully sheathed with the coating consisting at least of surface coating and base coating, but at least the force transmission zone is provided with the coating according to the present disclosure.

It is further possible for the rubber mixture of the foundational body to also contain a reactive diluent as per DIN 55945:2007-03 as constituent and/or for the textile cover ply used to have applied to it a separate coating, which contains the reactive diluent mentioned, before it is used as base coating.

A further problem addressed by the disclosure is that of providing a process for producing a force transmission belt, especially a toothed belt, wherein the profile of requirements which is mentioned at the beginning is ensured. The toothed belt can be fully sheathed by the process according to the disclosure, but at least the force transmission zone is coated by the process.

This problem is solved by at least the process steps of
  coating the force transmission zone and/or the top ply of the still unvulcanized belt blank with a base coating of textile material;

subsequently applying to the base coating a surface coating comprising at least a mixture A comprising at least a reactive diluent as per DIN 55945:2007-03 to form an overall coating;

vulcanizing the belt blank provided with the overall coating to form a bonded assembly of elastomeric foundational body and base coating.

Concerning the composition of mixture A, reference may be made here to the characterization already given in the above sections, particularly in respect of the reactive diluent and its selection. Further, reference may be made to the above characterization concerning the crosslinking agent and/or pulverulent gliding body advantageously additionally present in mixture A.

The surface coating applied as part of the process according to the present disclosure may additionally contain a second mixture B constructed at least of an isocyanate and/or at least a polyol. Similarly, the second mixture B may additionally contain at least a particulate filler.

Concerning the further characterization of the second mixture B and of the preferred ratio between mixture A as first mixture and mixture B as second mixture, reference may again be made to the above sections.

It is a particular advantage of the process according to the present disclosure that the surface coating penetrates into the base coating such that the depth of penetration of the surface coating into the base coating is equal to at least half the thickness of the base coating. Furthermore, an uninterrupted structure without open pores forms within the surface coating in the course of the process, so that any penetration of various media, such as oil for example, into the interior of the belt can be completely avoided.

The base coating is given a bonding-friendly preparation on the side of contact with the elastic foundational body. This means that at least an adhesion promoter, at least a bonding cement or at least a bonding-inducing rubber solution is used. Further processes or materials known to a person skilled in the art can also be used to ensure bonding between the base coating and the elastic foundational body.

Further advantages of the process according to the present disclosure are:

No flash-off is required;
Complete crosslinking of the surface coating can be realized, especially in combination with a free-radical crosslinking reaction;
Comparatively little if any solvent is needed.

The disclosure will now be more particularly presented using experiment examples. Table 1 shows the corresponding coating compositions, while Table 2 shows the experimental results. Comparative coatings known from the prior art are identified by "V", while coating compositions according to the present disclosure are identified by "E".

The particulars in Table 1 are all based on weight percent [% by weight].

TABLE 1

|   | V1 | V2 | E1 | E2 | E3 | E4 | E5 | E6 | E7 |
|---|----|----|----|----|----|----|----|----|----|
| mixture B[a] | 50 | — | — | — | — | — | — | — | 10 |
| mixture B[b] | 50 | — | — | — | 10 | — | — | — | 10 |
| HNBR[c] | — | 20 | 60 | — | — | — | — | — | — |
| ZDMA[d] | — | 20 | — | — | — | — | — | — | — |
| TBPD[e] | — | — | 10 | 4 | 4 | 4 | 4 | 4 | 4 |
| bismaleimide | — | — | 10 | — | — | — | — | — | — |
| PTFE powder | — | 60 | 10 | 20 | 20 | 20 | 20 | 20 | 20 |
| RV1 | — | — | 10 | 43 | 38 | 33 | 33 | — | 23 |
| RV2 | — | — | — | 33 | 28 | — | — | — | — |

TABLE 1-continued

|   | V1 | V2 | E1 | E2 | E3 | E4 | E5 | E6 | E7 |
|---|----|----|----|----|----|----|----|----|----|
| RV3 | — | — | — | — | — | 43 | — | — | — |
| RV4 | — | — | — | — | — | — | 43 | 43 | 33 |
| RV5 | — | — | — | — | — | — | — | 33 | — |

[a]and[b]PTFE powder, solvent mixture of the polyurethane-forming components diisocyanate and a mixture of short and medium-chain diols, essentially 1,2-propanediol, ethanediol and 1,6-hexanediol, and polyester polyols with short and medium —O—$C_xR_y$—O—building blocks, Xylan 1642 A ([a]) and Xylan 1642 B ([b]), from Whitford
[c]hydrogenated acrylonitrile-butadiene copolymer, Therban C3446, from Lanxess
[d]zinc dimethyl acrylate
[e]di(tert-butylperoxyisopropyl)benzene, Parkadox 1440, from Akzo
RV1: reactive diluent 1, hexanediol diacrylate (HDDA), Laromer ® HDDA, from BASF
RV2: reactive diluent 2, aliphatic urethane acrylate, 70% solution in HDDA, Laromer ® LR 8987, from BASF
RV3: reactive diluent 3, aliphatic urethane acrylate, 65% solution in tripropylene glycol diacrylate (TPGDA), Laromer ® UA 19 T, from BASF
RV4: reactive diluent 4, unsaturated polyester resin, 55% solution in dipropylene glycol diacrylate (DPGDA), Laromer ® UP 35 D, from BASF
RV5: reactive diluent 5, TPGDA, Laromer ® TPGDA, from BASF

TABLE 2

|   | V1 | V2 | E1 | E2 | E3 | E4 | E5 | E6 | E7 |
|---|----|----|----|----|----|----|----|----|----|
| noises | ++ | − | − | − | 0 | − | − | − | ++ |
| abrasion resistance | − | − | − | ++ | ++ | + | + | + | 0 |
| oil resistance | − | 0 | − | ++ | ++ | ++ | ++ | ++ | 0 |
| friction | + | 0 | − | ++ | + | ++ | ++ | ++ | + |
| heat resistance | − | + | + | ++ | + | ++ | ++ | 0 | 0 |

−: worse behavior
0: neutral behavior
+: better behavior
++: distinctly better behavior

BRIEF DESCRIPTION OF THE DRAWINGS

The disclosure will now be further described using two exemplary embodiments with reference to schematic depictions, where.

DESCRIPTION OF THE PREFERRED EMBODIMENTS OF THE INVENTION

Figure 1:
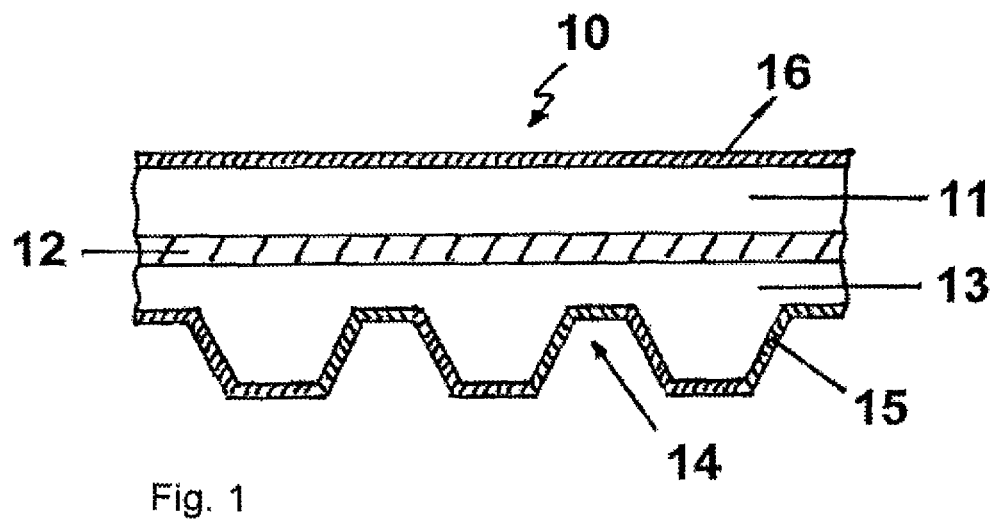
FIG. 1 shows a longitudinal section through a toothed belt having a coating for the force transmission zone and for the top ply; and, FIG. 2 shows a longitudinal section through a force transmission belt having a surface coating and a base coating.

FIG. 1 shows a drive belt 10 in the form of a toothed belt with a top ply 11 as belt backing, a strength component ply 12 in the form of tensile components forming a parallel arrangement in the longitudinal direction, and also with a substructure 13. The substructure comprises the force transmission zone 14. Both the top ply 11 and the force transmission zone 14 are each provided with a coating (15, 16).

Figure 2:
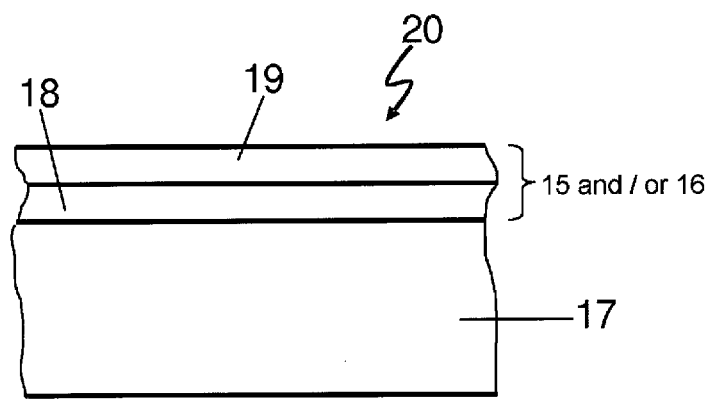

FIG. 2 shows a force transmission belt 20 with an elastic foundational body 17 as an overall unit formed from top ply and substructure. The coating (15, 16) on the force transmission zone and/or the top ply includes a base coating 18 and a surface coating 19. The base coating 18 consists of a textile material which combines with the elastic foundational body 17 to form a bonded assembly. The surface coating 19 comprises at least a mixture A which contains at least a reactive diluent as per DIN 55945:2007-03. In respect of further constituents of mixture A and of the use of a second mixture B, reference is made to the abovementioned observations.

The depth of penetration of surface coating 19 into base coating 18 is equal to at least half the thickness of base coating 18. The surface coating 19 has an uninterrupted structure without open pores.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description 10 toothed belt
20 force transmission belt
11 top ply as belt backing
12 strength components in the form of tensile strands
13 substructure
14 force transmission zone
15 coating on force transmission zone
16 coating on top ply
17 elastic foundational body
18 base coating
19 surface coating

What is claimed is:

1. A force transmission belt having an elastic foundational body, comprising a top ply as belt backing and a substructure having a force transmission zone, wherein the force transmission zone and/or the top ply is/are provided with a coating,
wherein the coating on the force transmission zone and/or the top ply has at least the following layered construction:
a base coating of a textile material, wherein the base coating combines with the elastic foundational body to form a bonded assembly, and
a surface coating comprising a mixture A containing at least a reactive diluent as per DIN 55945:2007-03.

2. The force transmission belt as claimed in claim 1, wherein the base coating is a woven or knitted fabric.

3. The force transmission belt as claimed in claim 1, wherein the reactive diluent as per DIN 55945:2007-03 is selected from the group consisting of methacrylates, acrylates, vinyl ethers, and glycidyl ethers, or a mixture thereof.

4. The force transmission belt as claimed in claim 3, wherein the reactive diluent as per DIN 55945:2007-03 is selected from the group consisting of methacrylates and acrylates, or a mixture thereof.

5. The force transmission belt as claimed in claim 1, wherein the mixture A comprises from 2% to 90% by weight of a reactive diluent as per DIN 55945:2007-03.

6. The force transmission belt as claimed in claim 1, wherein the mixture A further comprises at least one of a crosslinking agent and a pulverulent gliding body.

7. The force transmission belt according to claim 1, wherein the surface coating further comprises a second mixture B composed of at least an isocyanate and/or at least a polyol.

8. The force transmission belt according to claim 7, wherein the ratio of the mixture A to the second mixture B is in the range from 7:1 to 1:1.

9. The force transmission belt according to claim 1, being configured as a toothed belt.

10. A process for producing a force transmission belt having an elastic foundational body, comprising a top ply as belt backing and a substructure having a force transmission zone wherein the force transmission zone and/or the top ply is provided with a coating, the process comprising:
coating the force transmission zone and/or the top ply of the still unvulcanized belt blank with a base coating of textile material;
subsequently applying to the base coating a surface coating comprising a mixture A comprising at least a reactive diluent as per DIN 55945:2007-03 to form an overall coating;
vulcanizing the belt blank provided with the overall coating to form a bonded assembly of the elastomeric foundational body and the base coating.

11. The process as claimed in claim 10, wherein the mixture A further comprises at least one of a crosslinking agent and a pulverulent gliding body.

12. The process as claimed in claim 10, wherein the surface coating further comprises a second mixture B composed of at least an isocyanate and/or at least a polyol.

13. The process as claimed in claim 10 for producing a toothed belt.

* * * * *